United States Patent [19]

Townsend

[11] Patent Number: 4,670,942
[45] Date of Patent: Jun. 9, 1987

[54] CHUCK FOR MEAT ENCASING MACHINE

[75] Inventor: Ray T. Townsend, Des Moines, Iowa

[73] Assignee: Townsend Engineering Company, Des Moines, Iowa

[21] Appl. No.: 921,368

[22] Filed: Oct. 20, 1986

[51] Int. Cl.⁴ ............................................. A22C 11/10
[52] U.S. Cl. ............................................. 17/33; 17/41
[58] Field of Search ....................... 17/1 R, 33, 34, 41, 17/42, 49

[56] References Cited

U.S. PATENT DOCUMENTS 3,191,222  6/1965  Townsend ............................... 17/33
4,073,039  2/1978  Müller et al. ......................... 17/33 X Primary Examiner—Willie G. Abercrombie
Attorney, Agent, or Firm—Zarley, McKee, Thomte, Voorhees & Sease

[57] ABSTRACT

A chuck for a meat encasing machine which has a meat emulsion pump in communication with an elongated stuffing horn, and a chuck housing on the machine adjacent the discharge end of the horn and having a rotatable chuck-receiving bearing means. A chuck member is imposed in the bearing means and includes a body member with a central hollow bore and a plurality of rollers rotatably mounted on the body member adjacent the discharge end of the bore. Each of the rollers has an axis of rotation which dwells in a plane substantially perpendicular to the axis of the bore. Each roller has outer meat encasing contact surface with the rollers being positioned on the body member so that the contact surfaces thereof collectively define a conduit for a meat-filled tubular casing passing through the bore in a direction from the intake end towards the discharge end. The contact surface of each roller is comprised of a plurality of disk portions having tapered peripheral edges which are adapted to deform a filled meat casing passing therethrough so as to impart rotational motion to the casing while at the same time imposing only a slight longitudinal drag thereon.

16 Claims, 8 Drawing Figures

U.S. Patent   Jun. 9, 1987   Sheet 1 of 2   4,670,942
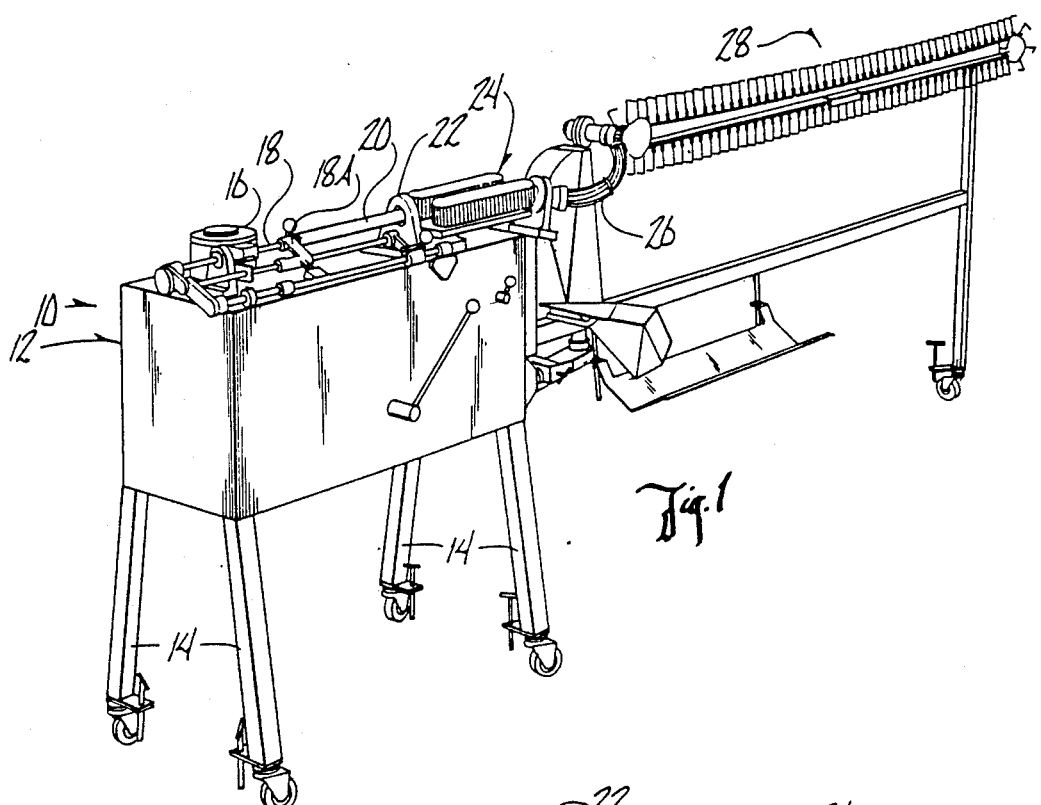
Fig. 1
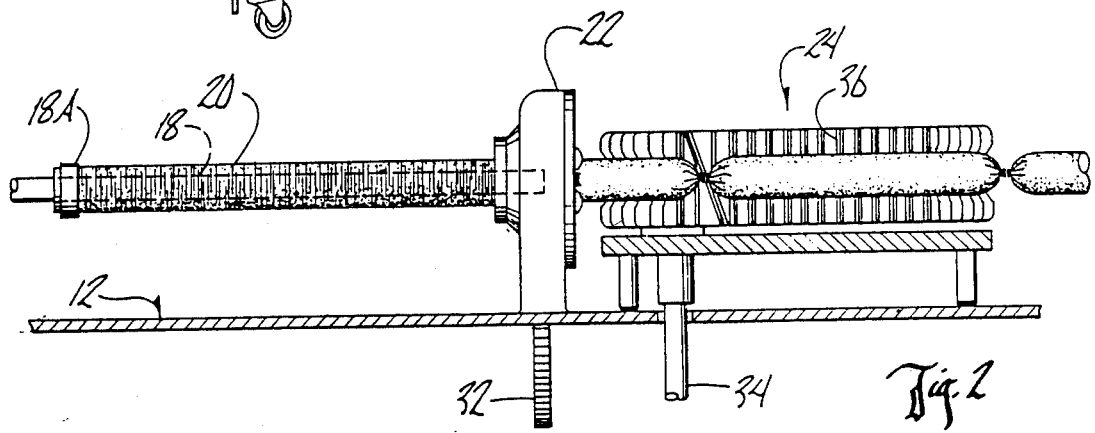
Fig. 2
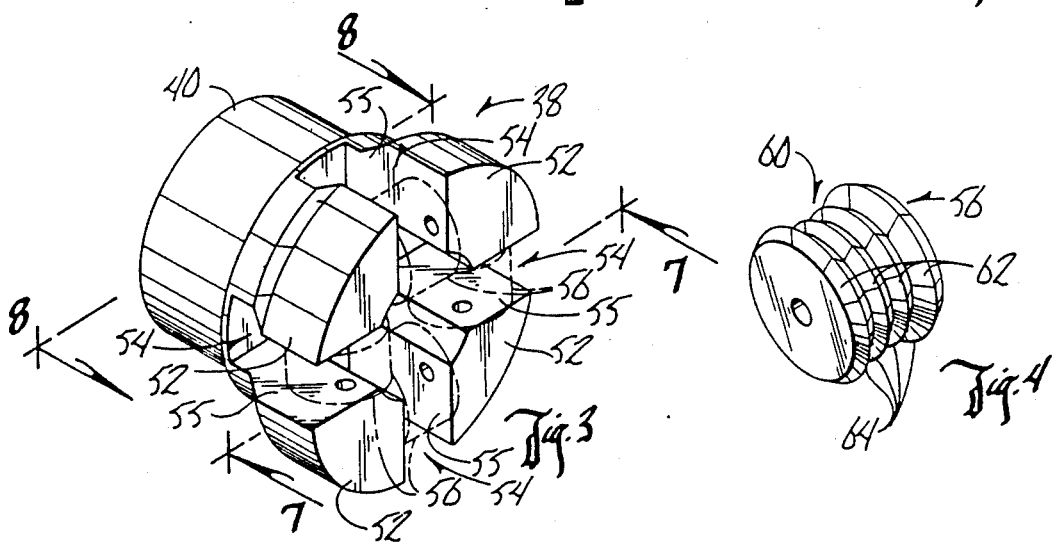
Fig. 3
Fig. 4

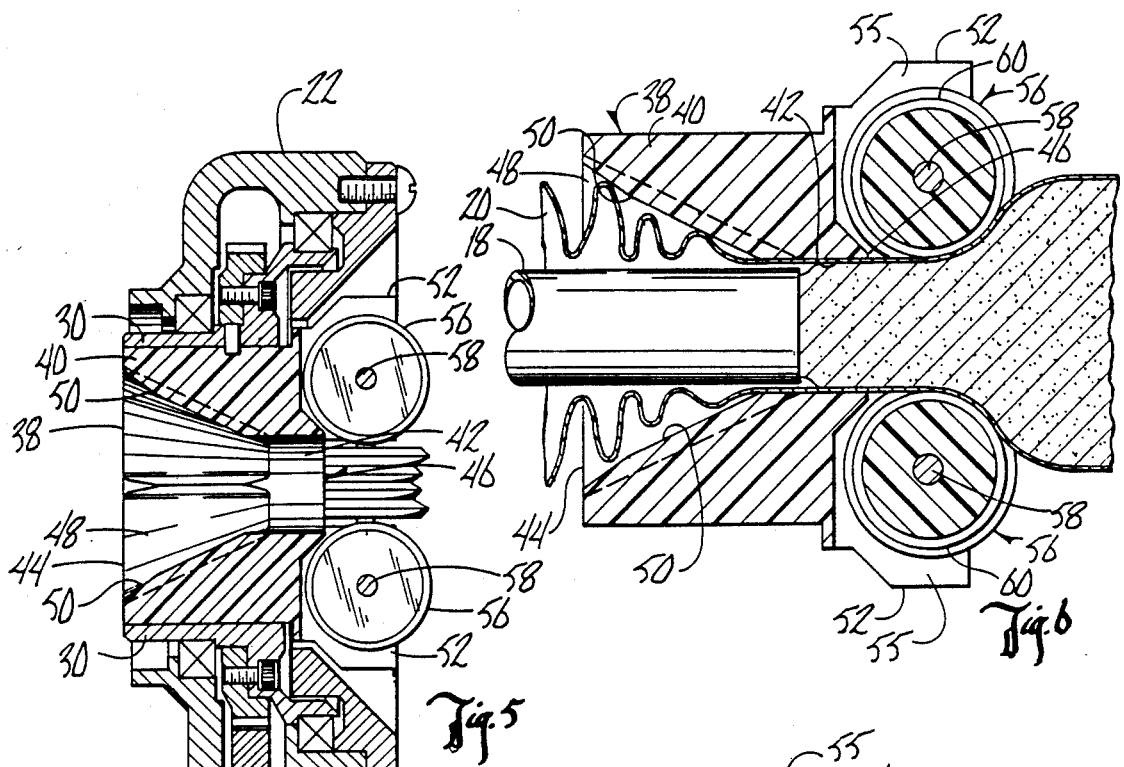
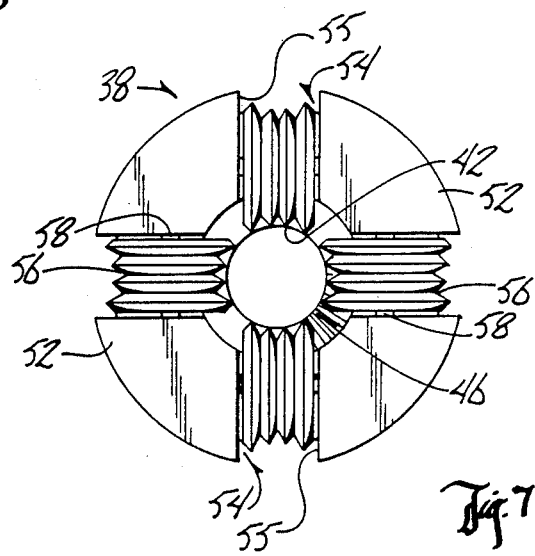
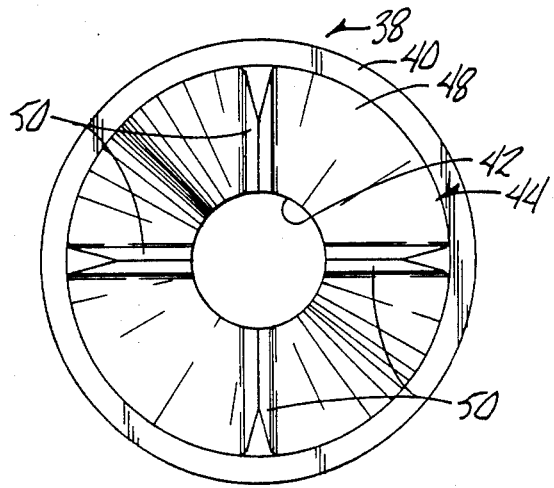

CHUCK FOR MEAT ENCASING MACHINE

BACKGROUND OF THE INVENTION

Meat encasing machines of the type shown in U.S. Pat. No. 3,191,222 utilize a chuck member on the downstream end of the stuffing horn or tube. The chuck holds back the hollow tubular shirred casing that is slidably mounted on the stuffing tube and imposes a longitudinal drag on the casing as the casing emerges from the end of the tube as meat emulsion discharges from the end of the tube into the casing. Without this dragging action, the meat emulsion will not stuff tightly enough into the casing. These conventional chucks are rotatably powered and serve the second purpose of providing rotational force or torque to the casing so that the casing will be twisted at a point where the pinchers of the conventional linking apparatus pinch the casing together.

Elongated longitudinal flutes inside the conventional chucks engage the casing as it is being filled. These flutes must be exactly the right size so that the filled casing will have sufficient engagement with the flutes to provide the right amount of dragging force without providing so much dragging force that the casing will burst with an excessive amount of meat emulsion. In addition, the flutes of the conventional chucks must have enough grip on the casing to provide rotary force for rotating the casing to cause a twist in the link.

It has always been a compromise to design a chuck small enough to bite into or dent the casing sufficiently to give adequate rotational force, and at the same time, still have the chuck large enough so that it will not cause too much drag on the casing to cause overstuffing. Conventionally, it is necessary to use a chuck that is just the correct size for each casing. As soon as that chuck wears slightly, it must be replaced. In actual practice, chucks are considered expendable and are replaced every day or so. This amounts to a considerable maintenance cost.

It is, therefore, a principal object of this invention to provide a chuck member for meat encasing machines which can effectively grip a meat-filled casing for adequate rotational purposes without, at the same time, imposing excessive longitudinal drag on the casing.

Another object of this invention is to provide a chuck member for meat encasing machines which can handle several different sizes or diameters of casing.

A further object of this invention is to provide a chuck member for meat encasing machines which will resist wear and which will not have to be replaced frequently if at all during the life of the meat encasing machine.

These and other objectives will be apparent to those skilled in the art.

SUMMARY OF THE INVENTION

The chuck member of the instant invention comprises a body member which has a central hollow bore extending along its central axis. This bore is adapted to receive the discharge end of the stuffing tube upon which the shirred casing is placed. The central bore of the body member has an intake end and a discharge end.

A plurality of rollers are rotatably mounted on the body member adjacent the discharge end of the bore. Each of the rollers has an axis of rotation which dwells in a plane substantially perpendicular to the central axis of the bore.

Each of the rollers has an outer meat casing contact surface preferably comprising a plurality of adjacent disks. These rollers are positioned radially around the bore so that the contact surfaces thereof collectively define a conduit for the meat-filled tubular casing to pass therethrough in a direction from the intake end towards the discharge end of the bore. The contact surfaces of the rollers impose a slight longitudinal drag on the casing to impede the free longitudinal movement thereof through the conduit. At the same time, the contact surfaces of the rollers can substantially deform the casing as to be imbedded therein to permit the rollers to impart considerable rotational force to the casing without correspondingly increasing the longitudinal drag thereon.

A BRIEF DESCRIPTION OF THE DRAWINGS

FIG. 1 is a perspective view of a meat encasing machine embodying the chuck member of this invention;

FIG. 2 is a partial sectional view of a portion of the machine shown at an enlarged scale and illustrating the stuffing tube, the chuck housing, and the linking mechanism;

FIG. 3 is an enlarged scale perspective view of the chuck member of this invention;

FIG. 4 is an enlarged scale perspective view of one of the roller members which are mounted on the chuck member;

FIG. 5 is an enlarged longitudinal sectional view taken through the chuck housing and the chuck member;

FIG. 6 is an enlarged scale sectional view similar to that of FIG. 5 but showing the shirred casing being filled and passing through the chuck member;

FIG. 7 is an elevational view of the chuck taken on lines 7—7 of FIG. 3; and

FIG. 8 is an elevational view of the chuck taken on line 8—8 of FIG. 3.

DESCRIPTION OF THE PREFERRED EMBODIMENT

Except for the chuck member which will be described hereafter, machine 10 of FIG. 1 contains the essential conventional components of the machine generally described in U.S. Pat. No. 3,191,222. Machine 10 includes a frame 12 supported on four legs 14. A meat emulsion pump 16 is mounted on frame 12. A retractable stuffing horn 18 is in communication with the pump 16, and the meat emulsion is conventionally pumped from a reservoir (not shown) through pump 16 and into stuffing horn 18. A conventional follower 18A is slidably mounted on stuffing horn 18 to move a hollow shirred tubular casing 20 towards the discharge end of the stuffing horn opposite to the pump 16. A chuck housing 22 surrounds the discharge end of horn 18. A conventional linking mechanism 24 is located on frame 12 just downstream from the chuck housing 22. A conventional discharge horn 26 is mounted on the frame 12 and is adapted to receive linked sausages or the like from linking mechanism 24. The conventional swinging action of horn 26 loops the linked sausages on the conventional conveyor 28.

Chuck housing 24 includes a rotatable bearing 30 which is rotatably connected to drive gear 32, which in turn is connected to a source of rotational power (not shown). Similarly, a power shaft 34 is connected to linking mechanism 24 to cause rotation of the conventional linking chains 36 which served to link the encased meat product. Again, the structure described heretofore is conventional and does not of itself comprise the essence of the instant invention.

The chuck 38 comprises a generally cylindrical body 40 having a center bore 42 extending along the longitudinal axis thereof. The numerals 44 and 46 designate the intake and discharge ends of the bore 42. The bore 42 has a flared or tapered portion 48 adjacent the intake end 44 in which are imposed a plurality of elongated straight flutes 50.

An enlarged diameter shoulder 52 surrounds the discharge end of chuck 38 and has a plurality of notches 54 cut therein. Preferably, four such notches are cut to divide shoulder 52 into four segments. Each segment has a flat face 55 adjacent each notch 54.

Four rollers 56 extend between opposite faces 55 of adjacent shoulder segments 52, and are rotatably supported on shafts 58 which dwell in a plane perpendicular to the longitudinal axis of bore 42. Each roller has a casing contact surface 60 which preferably is divided into a plurality of disk portions 62 having tapered peripheral edges 64. The outer disk portion 62 have a slightly greater diameter than the inner disk portion 62 so that the four casing contact surfaces 60 collectively define a conduit 66 which is substantially cylindrical in cross-section.

Chuck 38 is preferably machined from a block of plastic material. The rollers 56 can be machined from a similar material. The assembled chuck of FIG. 3 is inserted within bearing 30 of chuck housing 22 and is held within the bearing by a detent or the like (not shown).

A shirred casing 20 is conventionally loaded on stuffing horn 18 by retracting the horn conventionally, placing the shirred tubular casing thereon, and then moving the horn forwardly until the discharge end thereof dwells within the bore 42 of chuck 38 as best shown in FIG. 6.

In the meat encasing operation, the bearing 30 and chuck 38 are rotating about the center axis of the chuck. The meat emulsion is pumped through the stuffing horn 18 and into the casing 20 which surrounds the discharge end of the horn. Flutes 50 guide the casing to conform essentially to the outside diameter of the horn. As seen in FIG. 6, as soon as the filled casing moves downstream from the discharge end 46 of the horn 18, the outer surface of the casing is engaged by the disk portions 62 of rollers 56. The disk portions bite into the filled casing and a lateral rotational motion is then imparted to the casing by the rollers 56 which are rotating with the chuck 38. At the same time, the rollers 56 are rotating about shafts 58 so as to impart very little drag or resistance to the longitudinal movement of the casing through the conduit 66. This arrangement of structure permits the chuck 38 to have a substantial grip on the filled casing for rotational purposes, while at the same time, only a slight amount of drag is imposed on the filled casing to retard the longitudinal movement thereof.

Since the disk portions 62 of rollers 56 can deform casings of different diameters either a large degree or a small degree depending upon the relative diameter of the casing, the chuck 38 can thereupon accommodate a number of casings having varying diameters. Obviously, the casing material must have a diameter sufficient for the disk portions to engage and at least slightly deform the outer surface of the filled casings.

From the foregoing, it is seen that the device of this invention will achieve at least all of its stated objectives.

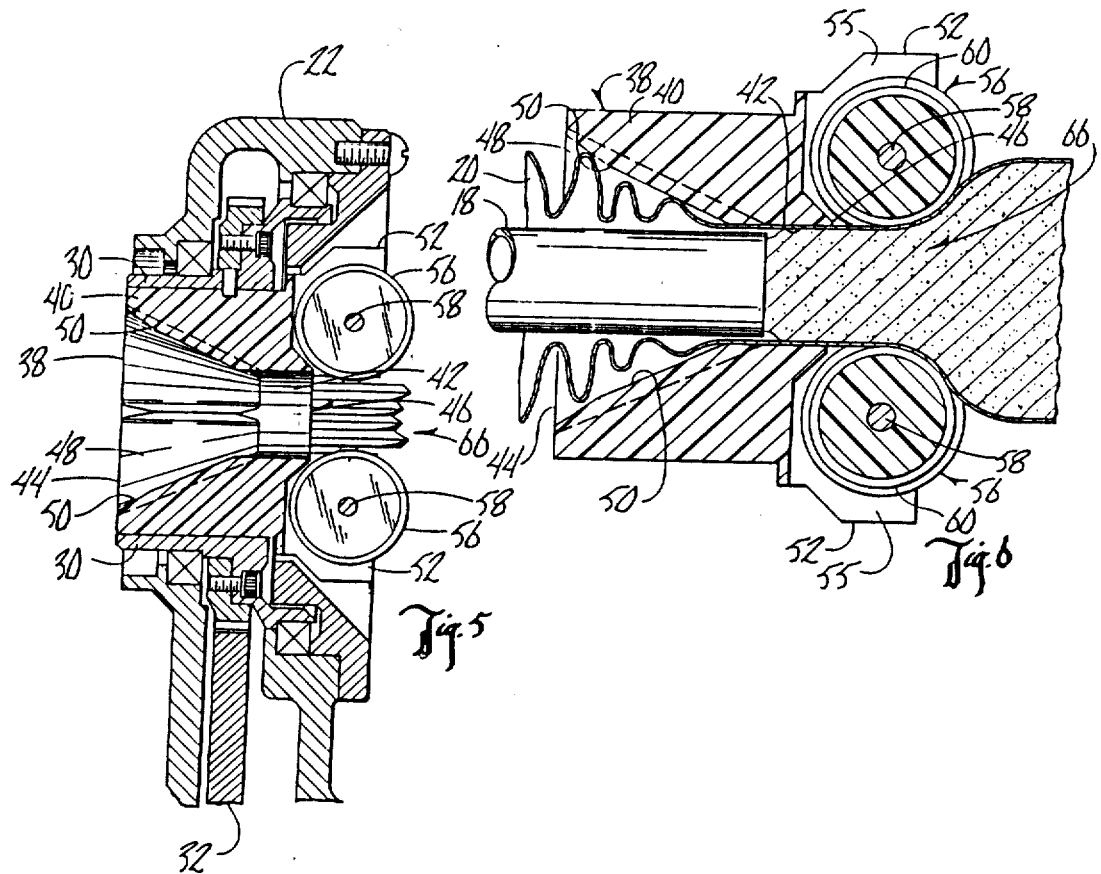

I claim:

1. A chuck member for a meat encasing machine, comprising, a body member having a central hollow bore defining a central axis;

said bore having an intake end and a discharge end, a plurality of rollers rotatably mounted on said body member adjacent said discharge end;

each of said rollers having an axis of rotation which dwells in a plane substantially perpendicular to said central axis;

each of said rollers having outer meat casing contact surfaces, said rollers being positoned on said body member in positions so that said contact surfaces collectively define a conduit for a meat-filled tubular casing passing through said bore in a direction from said intake end towards said discharge end.

2. The device of claim 1 wherein said rollers are positioned around the discharge end of said bore.

3. The device of claim 1 wherein the contact surfaces of said rollers comprise a plurality of disk portions.

4. The device of claim 1 wherein the contact surfaces of said rollers comprise a plurality of disk portions having tapered peripheral edges.

5. The device of claim 1 wherein the contact surfaces of said rollers comprise a plurality of disk portions, said plurality of disk portions comprising outer disks separated by inner disks with said outer disks having a diameter greater than said inner disks.

6. The device of claim 1 wherein a plurality of notch openings are positioned in said body member adjacent the discharge end of said bore, each of said notch openings having opposite parallel faces, one of said rollers being positoned in each of said notches between said faces.

7. The device of claim 1 wherein the intake end of said bore is tapered inwardly to a reduced diameter.

8. The device of claim 7 wherein a plurality of spaced elongated flutes are located in said tapered intake end.

9. A meat encasing machine comprising a meat emulsion pump in communication with an elongated stuffing horn having a discharge end, a chuck housing on said machine adjacent the discharge end and having a rotatable chuck-receiving bearing means, a linking means adjacent said chuck assembly for receiving and linking an elongated meat-filled tubular casing, the improvement comprising, a chuck member in said bearing means, comprising, a body member having a central hollow bore defining a central axis;

said bore having an intake end and a discharge end, a plurality of rollers rotatably mounted on said body member adjacent said discharge end;

each of said rollers having an axis of rotation which dwells in a plane substantially perpendicular to said central axis;

each of said rollers having outer meat casing contact surfaces, said discharge end of said stuffing horn terminating within said bore; said stuffing horn adapted to receive and slidably support on its outer surface a hollow tubular casing;

said rollers being positioned on said body member in positions so that said contact surfaces collectively define a conduit for a meat-filled tubular casing passing through said bore in a direction from said intake end towards said discharge end;
  said rollers being adapted to engage a meat-filled tubular casin passing through said conduit to rotate said casing about said central axis.

10. The device of claim 9 wherein said rollers are positioned around the discharge end of said bore.

11. The device of claim 10 wherein the contact surfaces of said rollers comprise a plurality of disk portions.

12. The device of claim 10 wherein the contact surfaces of said rollers comprise a plurality of disk portions having tapered peripheral edges.

13. The device of claim 9 wherein the contact surfaces of said rollers comprise a plurality of disk portions, said plurality of disk portions comprising outer disks separated by inner disks with said outer disks having a diameter greater than said inner disks.

14. The device of claim 9 wherein a plurality of notch openings are positioned in said body member adjacent the discharge end of said bore, each of said notch openings having opposite parallel faces, one of said rollers being positoned in each of said notches between said faces.

15. The device of claim 10 wherein the intake end of said bore is tapered inwardly to a reduced diamter.

16. The device of claim 15 wherein the intake end of said bore is tapered inwardly to a reduced diameter.

* * * * *

UNITED STATES PATENT AND TRADEMARK OFFICE
CERTIFICATE OF CORRECTION

PATENT NO. : 4,670,942  Page 1 of 2

DATED : June 9, 1987

INVENTOR(S) : Ray T. Townsend

It is certified that error appears in the above—identified patent and that said Letters Patent is hereby corrected as shown below:

Column 6, line 11, change "diamter" to --diameter--.

Column 6, lines 12-13, change "the intake end of said bore is tapered inwardly to a reduced diameter" to --a plurality of spaced elongated flutes are located in said tapered intake end--.

Figures 5 and 6 should be deleted to appear as per attached sheet.

Signed and Sealed this

Twenty-second Day of March, 1988

Attest:

DONALD J. QUIGG

Attesting Officer    Commissioner of Patents and Trademarks

UNITED STATES PATENT AND TRADEMARK OFFICE
CERTIFICATE OF CORRECTION

PATENT NO. : 4,670,942

DATED : June 9, 1987

INVENTOR(S) : Ray T. Townsend

It is certified that error appears in the above-identified patent and that said Letters Patent is hereby corrected as shown below: